US009880967B2

(12) United States Patent
Singh et al.

(10) Patent No.: US 9,880,967 B2
(45) Date of Patent: Jan. 30, 2018

(54) METHOD AND SYSTEM MAINTAINING QUALITY OF SERVICE (QOS) OF HOST COMMANDS IN MULTI-PORT, MULTI-FUNCTION PERIPHERAL COMPONENT INTERCONNECT EXPRESS (PCIE) DEVICES

(71) Applicant: SAMSUNG ELECTRONICS CO., LTD., Suwon-si, Gyeonggi-do (KR)

(72) Inventors: Santosh Singh, Bangalore (IN); Vikram Singh, Bangalore (IN)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 202 days.

(21) Appl. No.: 14/800,750

(22) Filed: Jul. 16, 2015

(65) Prior Publication Data

US 2016/0034415 A1    Feb. 4, 2016

(30) Foreign Application Priority Data

Jul. 31, 2014 (IN) .......................... 3747/CHE/2014
Dec. 29, 2014 (IN) .......................... 3747/CHE/2014

(51) Int. Cl.
| | | |
|---|---|---|
| G06F 13/00 | (2006.01) | |
| G06F 13/42 | (2006.01) | |
| G06F 13/28 | (2006.01) | |
| G06F 13/16 | (2006.01) | |

(52) U.S. Cl.
CPC ...... *G06F 13/4282* (2013.01); *G06F 13/1642* (2013.01); *G06F 13/28* (2013.01)

(58) Field of Classification Search
CPC ... G06F 13/4282; G06F 13/1642; G06F 13/28
See application file for complete search history.

(56) References Cited

U.S. PATENT DOCUMENTS

| | | | |
|---|---|---|---|
| 7,602,774 B1 | 10/2009 | Sundaresan et al. | |
| 8,250,197 B2 | 8/2012 | Gulati et al. | |
| 8,250,252 B1* | 8/2012 | Konda .................... | G06F 13/28 710/22 |
| 8,412,860 B2 | 4/2013 | Kishore et al. | |
| 8,484,392 B2 | 7/2013 | Manula et al. | |
| 8,537,706 B2 | 9/2013 | Cardona et al. | |
| 8,631,213 B2* | 1/2014 | Biswas ............... | G06F 13/1684 711/149 |
| 8,683,478 B2* | 3/2014 | Anderson .......... | G06F 9/45558 718/104 |
| 2006/0193327 A1* | 8/2006 | Arndt .................. | G06F 9/45537 370/395.21 |

(Continued)

*Primary Examiner* — Jing-Yih Shyu
(74) *Attorney, Agent, or Firm* — Volentine & Whitt, PLLC

(57) ABSTRACT

A method maintaining a fixed QoS for a PCIe device accessed by multiple hosts includes; receiving commands from the hosts in PCIe function queues of the PCIe device, fetching the commands from the PCIe function command queues, queuing the commands according to a command arbitration policy established for the PCIe device, storing the queued commands in an internal memory of the PCIe device, retrieving the queued commands from the internal memory in a sequence determined by applying a calculated QoS to at least one of the queued commands, and allocating PCIe device resources based on payload information corresponding to each one of the retrieved commands.

18 Claims, 3 Drawing Sheets

(56) References Cited

U.S. PATENT DOCUMENTS

| | | | |
|---|---|---|---|
| 2012/0131590 A1 | 5/2012 | Brownlow et al. | |
| 2012/0159090 A1* | 6/2012 | Andrews | G06F 9/5061 |
| | | | 711/153 |
| 2014/0059265 A1* | 2/2014 | Iyer | G06F 9/5011 |
| | | | 710/313 |
| 2014/0229941 A1 | 8/2014 | Bert et al. | |
| 2014/0237477 A1* | 8/2014 | Cadambi | G06F 9/5044 |
| | | | 718/103 |
| 2014/0310499 A1* | 10/2014 | Sundararaman | G06F 12/0269 |
| | | | 711/203 |
| 2015/0317266 A1* | 11/2015 | Kramer | G06F 13/368 |
| | | | 710/310 |
| 2017/0019908 A1* | 1/2017 | Lou | H04W 16/14 |

* cited by examiner

METHOD AND SYSTEM MAINTAINING QUALITY OF SERVICE (QOS) OF HOST COMMANDS IN MULTI-PORT, MULTI-FUNCTION PERIPHERAL COMPONENT INTERCONNECT EXPRESS (PCIE) DEVICES

CROSS-REFERENCE TO RELATED APPLICATION

This non-provisional U.S. patent application claims priority under 35 U.S.C. §119 from Indian Provisional Patent Application No. 3747/CHE/2014 filed on Jul. 31, 2014 and Indian Patent Application No. 3747/CHE/2014 filed on Dec. 29, 2014, the subject matter of which is hereby incorporated by reference.

TECHNICAL FIELD

The present inventive concept relates to Peripheral Component Interconnect express (PCIe) based devices and method of operating same. More particularly, the inventive concept relates to PCIe based storage devices and methods providing fixed Quality of Service (QoS) in relation to host Input/Output (I/O) commands in memory devices generally, multi-port, multi-function based NAND Flash storage devices particularly, and virtual as well as non-virtual storage devices supporting multiple PCIe functions.

BACKGROUND

Contemporary, flash memory-based Solid State Drives/Disks (SSDs) have grown enormously both in data storage capacity and popularity as a design feature of many electronic devices ("hosts"). Indeed, NAND flash-based storage devices ("NAND devices") are current available in multiple Terabytes (TBs) and the future promises greater data storage capacity and higher performance.

Current market trends indicate that PCIe based NAND devices are in great demand in enterprise as well as data center applications. In certain enterprise applications, storage domain multi-path and virtualization are two important features of storage devices. That is, a storage device should be useable (or accessible) by multiple host entities capable of using the storage device for different purposes.

The term Quality of Service ("QoS") is used to characterize the operating performance of a storage device in relation to one or more hosts. For example, QoS may be expressed as a minimum time within which the storage device responds to a request received from a host. For multi-function storage devices being accessed by multiple hosts, this minimum time should ideally be fixed and consistent across the range of hosts, regardless of the type of requests being issued by the respective hosts.

In this context, each host may be understood as creating a virtual environment within which the storage device is accessed. This virtual environment may define, sequence and execute a number of "tasks" respectively corresponding to requests received from one or more hosts. Certain hosts (e.g., hosts running one or more multimedia applications) may generate a large number of data I/O operations, while other hosts may run Online Transaction Processing (OLTP) or even a full blown database. If the storage device is unaware of the number and type of tasks being generated by each host, the QoS relative to different hosts may vary dynamically, dramatically, and in an unpredictable manner. Under such conditions, the storage device manufacturer will be unable to ensure a fixed and acceptable QoS for each host request. However, a predictable and reliable QoS is very important to the proper execution of OLTP and similar operations.

Accordingly, there is need to provide methods and systems capable of providing a fixed QoS across a range of hosts accessing a storage device using protocols and approaches specified by the PCIe.

SUMMARY

Embodiments of the inventive concept provide a method providing a fixed QoS to multiple hosts accessing a PCIe based NAND storage device via PCIe functions. These PCIe functions may be a physical function or a virtual function. This method applies to both virtualized and non-virtualized storage devices supporting PCIe functions.

In one embodiment, the inventive concept provides a method maintaining a fixed Quality of Service (QoS) for a Peripheral Component Interconnect Express (PCIe) device in relation to multiple hosts accessing the PCIe device. The method includes; receiving commands from the hosts in PCIe function queues of the PCIe device, fetching the commands from the PCIe function command queues, queuing the commands according to a command arbitration policy established for the PCIe device, and storing the queued commands in an internal memory of the PCIe device, retrieving the queued commands from the internal memory in a sequence determined by applying a calculated QoS to at least one of the queued commands, and allocating PCIe device resources based on payload information corresponding to each one of the retrieved commands.

In another embodiment, the inventive concept provides a method executing in a Peripheral Component Interconnect Express (PCIe) device a first command received from a first host and a second command received from a second host. The method includes; receiving the first command associated with a first PCIe function in a first PCIe port of the PCIe device and receiving the second command associated with a second PCIe function in a second PCIe port of the PCIe device, queuing the first and second commands according to a command arbitration policy established for the PCIe device, defining a sequence of execution for the first and second commands by applying a calculated Quality of Service (QoS) to the queued first and second commands, and allocating PCIe device resources based on payload information corresponding to the first and second commands.

In still another embodiment, the inventive concept provides a Peripheral Component Interconnect Express (PCIe) storage device providing a fixed Quality of Service (QoS) to multiple hosts accessing the PCIe storage device, including; PCIe ports configured to receive commands from any one of the hosts, PCIe function queues respectively associated with the PCIe ports, a module that fetches the commands from the PCIe function command queues, queues the commands according to a command arbitration policy established for the PCIe device, and stores the queued commands in an internal memory of the PCIe device, and a module that retrieves the queued commands from the internal memory in a sequence determined by applying a calculated QoS to at least one of the queued commands.

BRIEF DESCRIPTION OF THE DRAWINGS

Various objects, features and advantages associated with the inventive concept will be appreciated by those skilled in the art upon consideration of the following written description of embodiments and the accompanying drawings in which.

Figure 1:
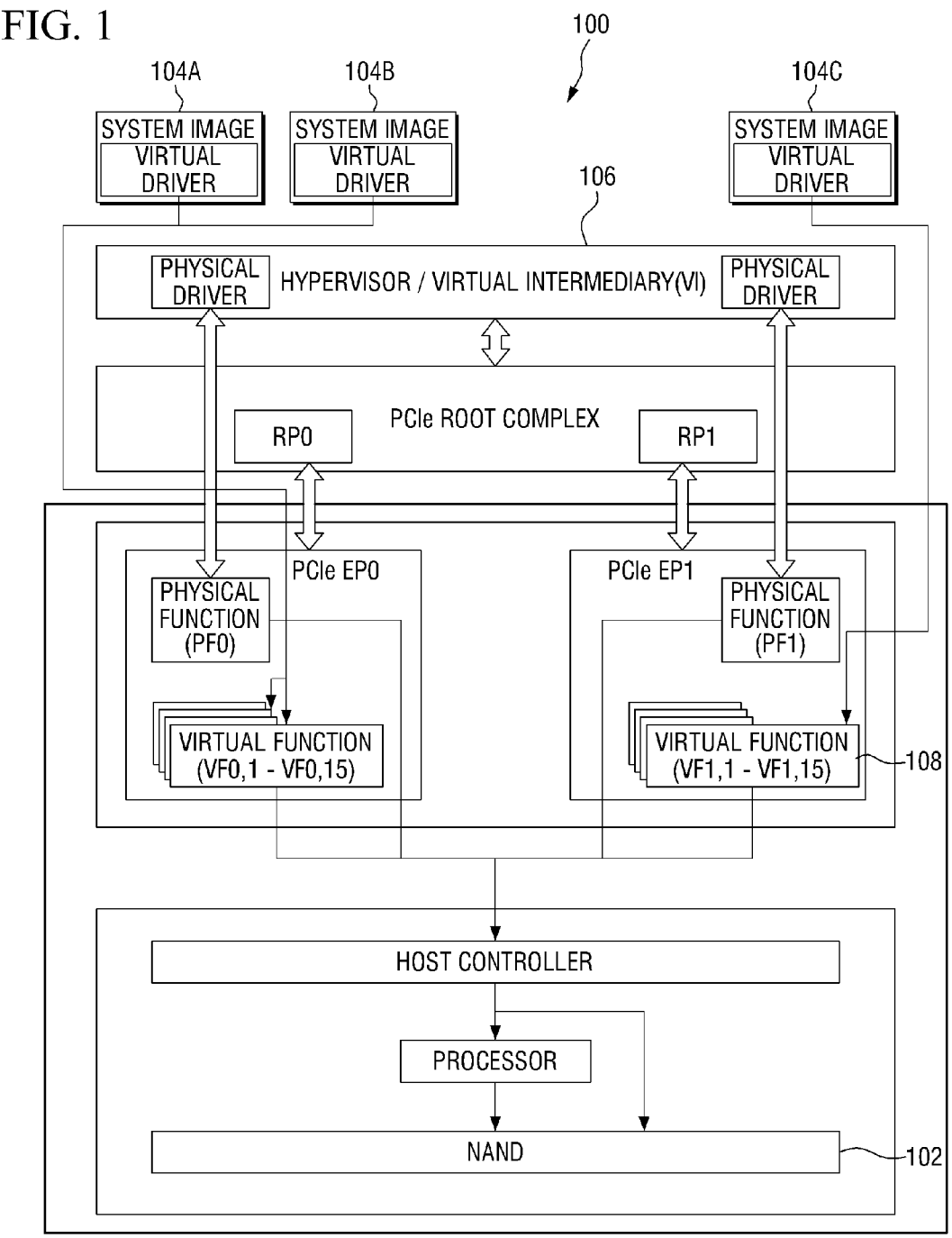
FIG. 1 is a block diagram illustrating an exemplary architecture of a data processing platform configured according to Single Root Input Output Virtualization (SR-IOV) according to an embodiment of the inventive concept.

Although specific features of certain embodiments of the inventive concept are shown in one or more of the drawings, such illustration is made for convenience of explanation in relation to one of more feature(s). These variously illustrated features may be combined in different configurations in accordance with differing embodiments of the inventive concept.

DETAILED DESCRIPTION

Certain embodiments of the inventive concept will now be described with reference to the accompanying drawings. Many different forms and embodiments are possible without deviating from the spirit and teachings of this disclosure and so the disclosure should not be construed as limited to the example embodiments set forth herein. Rather, these embodiments are provided so that this disclosure will be thorough and complete and will fully convey the present inventive concept to those skilled in the art, and the present inventive concept will only be defined by the appended claims. Throughout the written description and drawings, like reference numbers and labels are used to denote like or similar elements.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. As used herein, the term "and/or" includes any and all combinations of one or more of the associated listed items.

As used herein, the singular forms "a," "an," "the" and similar referents in the context of describing the present inventive concept are intended to include both the singular forms as well as the plural forms, unless the context clearly indicates otherwise. It will be further understood that the terms "comprising," "having," "including," and "containing", when used in this specification, specify the presence of stated features, steps, operations, elements and/or components, but do not preclude the presence or addition of one or more other features, steps, operations, elements, components and/or groups thereof.

It will be understood that, although the terms first, second, etc. may be used herein to describe various elements, these elements should not be limited by these terms. These terms are only used to distinguish one element from another element. Thus, for example, a first element, a first component or a first section could be termed a second element, a second component or a second section without departing from the teachings of the present inventive concept.

Unless defined otherwise, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Embodiments of the inventive concept provide various methods of ensuring a fixed QoS for multiple hosts accessing a PCIe based NAND storage device using one or more PCIe functions including a Physical Function (PF) and/or a Virtual Function (VF). This approach may be applied to both virtualized and non-virtualized storage devices supporting multiple PCIe functions.

In the following detailed description of the embodiments of the inventive concept, reference is made to the accompanying drawings that form a part hereof, and in which are shown by way of illustration specific embodiments in which the inventive concept may be practiced. These embodiments are described in sufficient detail to enable those skilled in the art to practice the inventive concept, and it is to be understood that other embodiments may be utilized and that changes may be made without departing from the scope of the inventive concept. The following detailed description is, therefore, not to be taken in a limiting sense, and the scope of the inventive concept is defined by the appended claims.

In relation to certain embodiments of the inventive concept, a multi-port, multi-function PCIe device is the one including multiple PCIe ports respectively capable of executing a PCIe function, where said PCIe function may be a virtual function or a physical function. Each one of these PCIe ports may be used as failover path or a main path. In this context, when one PCIe port (i.e., a PCIe port designated by a request as a main path) fails to accept a request from a host, another PCIe port may then accept the request as a failover path. In this manner, an available failover port may be used as a type of substitute main path in order to motivate data storage service in relation to multiple hosts issuing multiple requests. As a result, the failover path (and corresponding PCIe port) serves thereafter as a main path for execution of the request. This type of configuration is required in high availability solutions where multiple paths may be implemented to access a storage device to thereby avoid down time in an enterprise application. In a case where all the paths are currently being used as main paths, all of the PCIe functions receive service requests from a corresponding host.

A storage device that supports PCIe based virtualization implements (i.e., operates according to a particular specifications) either a Single Root Input Output Virtualization (SR-IOV) or a Multi Root Input Output Virtualization (MR-IOV). Certain I/O Virtualization technologies existed prior to PCIe based virtualization, but such technologies are deemed to be non-standard and/or variously problematic. Accordingly, the following written description focuses on embodiments configured according to one or more PCIe specifications, like SR-IOV and/or MR-IOV. In this regard, PCIe based virtualization allows storage devices to natively share resources (e.g., memory space, I/O queues, interrupts, commands, etc.) Thus, command processing for each interface may be uniquely designated to a PCIe function. By providing separate interfaces for each PCIe function, SR-IOV or MR-IOV enabled storage device may simultaneously receive commands from respective hosts without the requirement of middle layer processing. This ability ultimately reduces host latencies. Hence, in this kind of implementation each PCIe function may be independent of other PCIe functions.

The direct resource assignment in PCIe based virtualization provides very fast I/O and prevents the sharing of I/O devices. SR-IOV provides a mechanism by which single root functions (e.g., a storage device) appear as multiple, separate, physical devices to a host.

Figure (FIG. 1 is a block diagram illustrating an architecture of a platform 100 configured as a SR-IOV according to an embodiment of the inventive concept. In the platform 100, a storage device 102 is connected to multiple virtual hosts (or "machines") 104A, 104B, 104C, etc. A SR-IOV-capable device may be configured as a hypervisor or Virtual Intermediary (VI) 106 to appear in the PCI configuration space as multiple functions, each function having its own configuration space as indicated, for example, by a base address register. The hypervisor 106 assigns one or more Virtual Functions (VF) 108 to a Virtual Machine (VM) (e.g., 104A) by mapping the actual configuration space for the VF onto the configuration space provided to the virtual machine 104A by the hypervisor 106.

The Physical Function (PF) is a PCIe function of the storage device that supports the SR-IOV or MR-IOV interface. The PF includes the SR-IOV extended capability in the PCIe configuration space. This capability is used to configure and manage the SR-IOV functionality of the storage device, such as enabling virtualization and exposing VF.

The VF is a lightweight PCIe function on a storage device that supports the SR-IOV or MR-IOV interface. The VF is associated with the PF on the storage device and represents a virtualized presence of the storage device. Each one of the VF has its own PCIe configuration space, and may also share one or more physical resources on the storage device.

In SR-IOV enabled devices, physical functions are first discovered, and then by reading the PCIe configuration space, a SR-IOV capable host is able to scan all of the supported VF and enumerate/track a list of VF assigned to respective VM.

Certain embodiments of the inventive concept provide a method that ensures a fixed and consistent QoS for a multi-function, multi-port PCIe device. To provide the fixed QoS, the storage device must be aware of payload and access pattern(s) for each PCIe function. In this regard, the storage device implements a "QoS Checker" function (i.e., implements in hardware, firmware, and/or software) that detects payload and/or access pattern(s). Using the resulting "payload/access pattern information" and the available resources, the storage device indicates a time period during which a given command should be executed in order to meet an established QoS requirement. In this manner, the storage device uses a QoS Checker to normalize a host command payload in view of available resources.

Those skilled in the art will understand from the foregoing that QoS may be variously calculated. For example, all PCIe functions may be assigned an equal weight in terms of execution and resource allocation. Alternately, a given weight may be assigned to each PCIe function for resource allocation which is fixed before execution starts. In this later case, appropriate weighting information, or weighing determination criteria may be stored in the storage device and managed according to vendor specific software.

Figure 2:
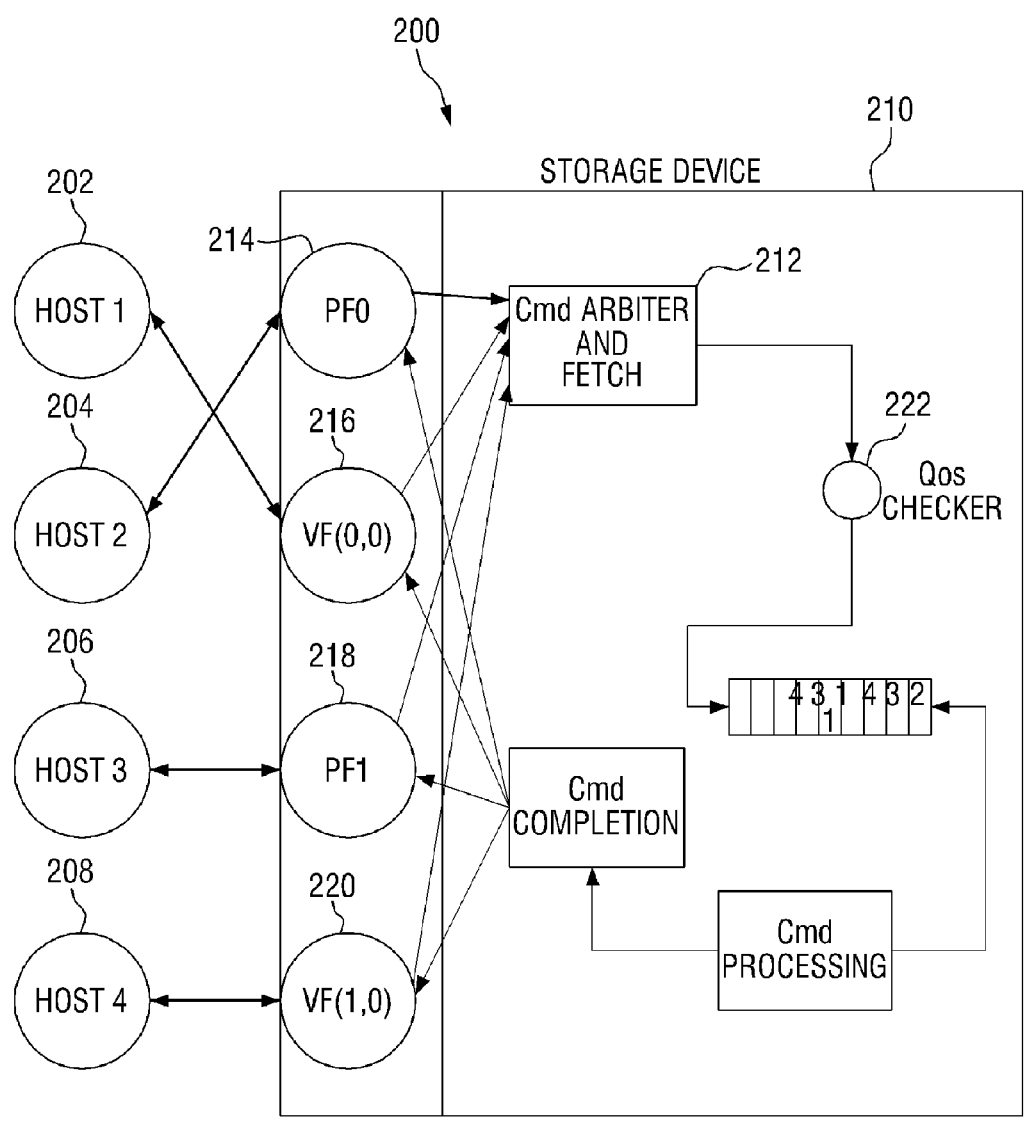
FIG. 2 is a conceptual diagram illustrating a method that may be used to calculate QoS without weighted functions according to an embodiment of the present inventive concept.

The conceptual diagram of FIG. 2 describes an approach to the calculation of QoS using equal weighting. That is, FIG. 2 is a conceptual diagram 200 illustrating a method of calculating QoS without weighted functions according to an embodiment of the inventive concept. The four hosts 202, 204, 206 and 208 are respectively assumed to be trying to access the storage device 210 by issuing various commands, and are further assumed to be executing different types of applications requiring a variety of payloads. In PCIe based storage device 210, a command arbiter and fetch module 212 fetches respective commands from each and every enabled PCIe function's 214, 216, 218 and 220; queues the commands according to a command arbitration policy established for the storage device 210; and then stores the queued commands in an internal memory (e.g., a SRAM/DRAM/TCM).

A QoS Checker module 222 retrieves the queued commands, and as needed, divides the commands into multiple command sets per available resources after applying a given QoS calculation. Those skilled in the art will recognize that various QoS calculations may be used. These QoS calculations may be quite complex, but must be applied in a timely manner in order to avoid the creation of one or more QoS timing conflicts. According to one basic QoS calculation that may be used for a single host, QoS may be calculated by dividing a total of all free data transfer resources available in a storage device for each function by the total payload for each function, where the total payload may be determined by adding the total commands in a Run Queue to that of a Wait Queue. This approach essentially calculates per command memory resources and processor execution time available at any given point in time, where each host has an equal access weighting (i.e., a defined access fairness quota).

The foregoing example assumes that each of the pending command is executed using given memory resources, and thereafter, the command is pushed to the Wait Queue. After a specified time, the QoS is again calculated for total outstanding commands in the same manner. This way the storage device serves all the hosts according to an established, fixed QoS. This outcome may be particularly desirable for enterprise systems wherein each running application requires a fixed start of service time.

With continued reference to FIG. 2, an exemplary approach to the accessing of the storage device 210 by hosts 202, 204, 206 and 208 is explained. Here, it is further assumed that the four hosts 202, 204, 206 and 208 access the storage device according to the following pattern of I/O Requests:

For Host 1—16 KB, 4 KB, 128 KB and 64 KB;
For Host 2—128 KB, 2 MB, 64 MB and 64 MB;
For Host 3—128 KB, 4 KB, 4 KB and 4 KB; and
For Host 4—16 KB, 512 B, 512 B and 512 B.

Thereafter, following an initial command queue level arbitration, the arbitrated command queue is assumed to contain, in order, a sequence of commands associated with the following I/O requests:

128 KB; 16 KB; 128 KB; and 16 KB.

Now, since all of the PCIe functions are equally weighted, the Run Queue of the storage device 210 may look as follows before applying QoS.

| 128 KB | 16 KB | 128 KB | 16 KB |
|--------|-------|--------|-------|
| VF1,0  | PF0,0 | PF1,0  | VF1,0 |

Yet, after applying QoS, the Run Queue may look as follows:

| 16 KB | 16 KB | 16 KB | 16 KB |
|-------|-------|-------|-------|
| VF1,0 | PF0,0 | PF1,0 | VF1,0 |

Looking at the Run Queue before application of QoS, it is clear that the commands are respectively associated with different data transfer sizes. If the storage device 210 begins command processing without first considering data transfer size for each command, it is possible that execution of certain commands issued by some hosts may "starve" other hosts due to their relatively huge data transfer size. To overcome this problem, certain embodiments of the inventive concept provide a method that provides a fixed QoS, whereby respective payload for each host is tracked and a corresponding command execution time is determined and storage device resources allocated accordingly. Now considering the Run Queue described above, after applying QoS, it is clear that all the host requests will be given equal weighing during execution.

In the illustrated embodiments of the inventive concept, the storage device 210 is assumed to uses total data transfer length counters, per each PCIe function, as well as available memory resource counters. Accordingly, using an appropriate formula a processor may be used to calculate an execution time and memory resource to-be-allocated to each command (and therefore each host issuing the command). Each command may then be executed in an adjusted order per the allocated resources after which the command may be pushed to the Wait Queue until a next execution cycle iteration.

In a next QoS calculation cycle, all commands listed in an arbitrated command queue, as well as commands listed in the Wait Queue are considered for execution, and a corresponding Run Queue is organized, as described above, by applying the newly calculated QoS. In this manner, various commands from different hosts may be served in accordance with a QoS that is maintained among all PCIe functions accessed by the different hosts.

With the foregoing "equal weighting" example in mind, a "different weighting" example will now be described. Here, it is assumed that a vendor is required to assign a weighting to each command or command type for each host, wherein each command is associated with one or more PCIe functions. Under this assumption, QoS checking is more complex.

To further illustrate this approach, it is assumed that there are four (4) PCIe functions, two (2) of which are physical functions (PF0,0 & PF1,0), and another two (2) that are virtual functions (VF0,0 & VF1,0). Weights are assigned to each PCIe function by device users as follows: PF0,0→40%; VF0,0→10%; PF1,0→40%; and VF1,0→10%. Accordingly, while calculating QoS, each assigned weight is taken into consideration as available execution time is allocated amongst the four (4) PCIe functions.

Figure 3:
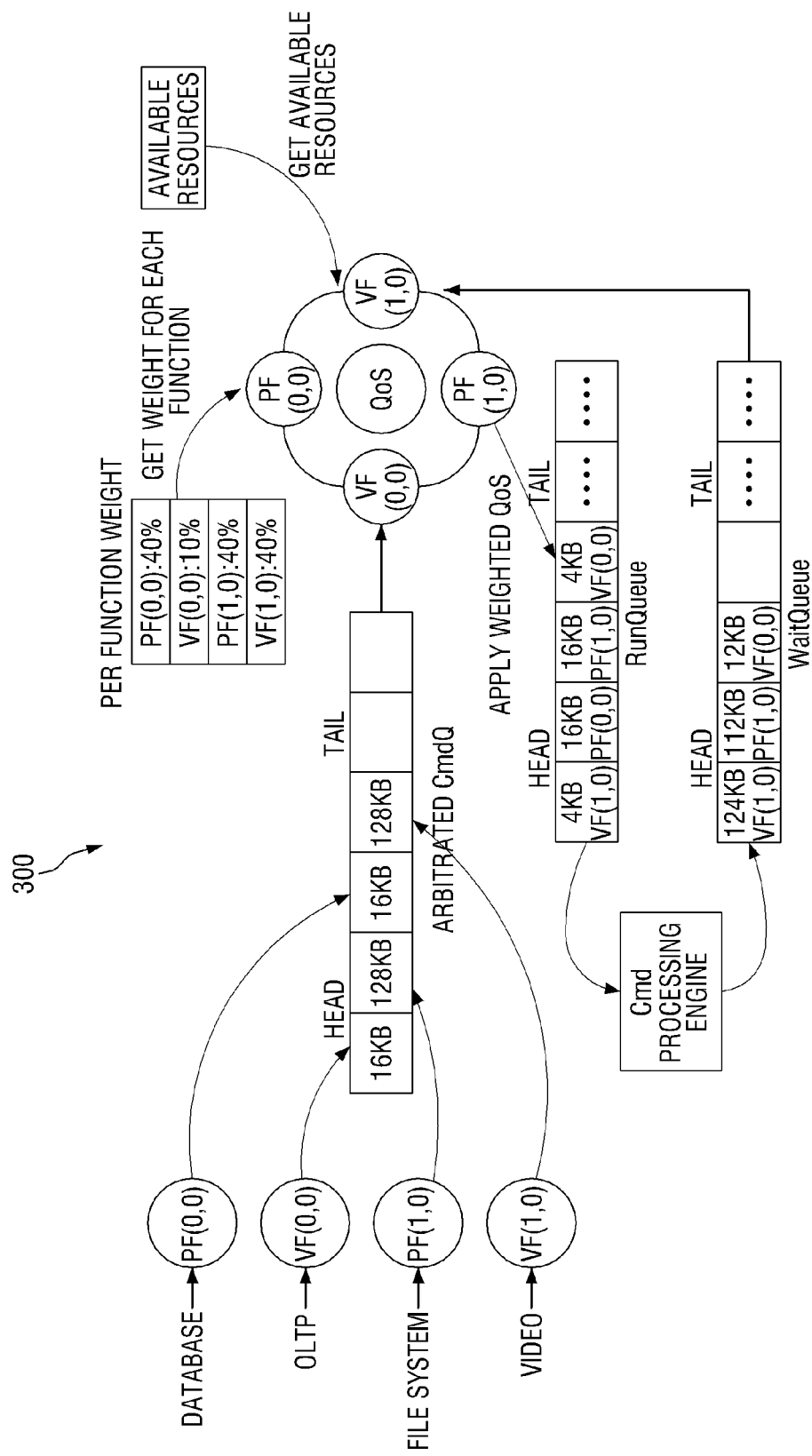
FIG. 3 is a conceptual diagram illustrating a method that may be used to calculate QoS with weighted functions according to an embodiment of the present inventive concept.

FIG. 3 is a conceptual diagram 300 illustrating a method of calculating QoS with weighted functions according to an embodiment of the inventive concept. QoS is calculated as per the weight of each PCIe function and execution time is assigned accordingly. From the Run Queue it is clear that physical functions have more weight, so their allocation of execution time is greater than that of the virtual functions. Similar to non-weight based QoS calculation, after initial execution, all commands are pushed to the Wait Queue where they wait for a next QoS calculation cycle. As soon as the commands are completely executed as per the host request, the command completion is sent to the host and the command is cleared from Run Queue and/or Wait Queue.

The foregoing approach may be implemented according to various address scenarios such as, one or more hosts may not run on equal priority tasks and few tasks might be of high priority which required more time in the storage device to execute.

The foregoing embodiments of the inventive concept have been described with reference to specific, illustrated examples. However, those skilled in the art will understand that various modifications and changes may be made to these embodiments without departing from the broader scope of the inventive concept. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium.

Although the embodiments herein are described with various specific embodiments, it will be obvious for a person skilled in the art to practice the inventive concept with modifications. However, all such modifications are deemed to be within the scope of the claims. It is also to be understood that the following claims are intended to cover all of the generic and specific features of the embodiments described herein and all the statements of the scope of the embodiments which as a matter of language might be said to fall there between.

What is claimed is:

1. A method of maintaining a fixed Quality of Service (QoS) for a Peripheral Component Interconnect Express (PCIe) storage device in relation to multiple hosts accessing the PCIe storage device, the method comprising:
   receiving a plurality of commands from the hosts in PCIe function queues of the PCIe storage device;
   fetching a subset of the plurality of the commands from the PCIe function queues, queuing the subset of commands in a first sequence according to a command arbitration policy established for the PCIe storage device, and storing the queued subset of commands in an internal memory of the PCIe storage device;
   retrieving the queued subset of commands from the internal memory as retrieved commands in a second sequence determined by applying a calculated QoS to at least one of the queued subset of commands;
   allocating PCIe device resources to an allocation of PCIe device resources based on payload information corresponding to each one of the retrieved commands;
   determining an execution time for each one of the retrieved second commands;
   pushing at least one of the retrieved commands to a wait queue; and
   calculating the calculated QoS for at least one command included in a combination of the queued subset of commands and the at least one command pushed to the wait queue following the determination of the execution time.

2. The method of claim 1,
   wherein the queued subset of commands are divided into a plurality of command sets corresponding respectively to multiple tasks based on the allocation of PCIe device resources.

3. The method of claim 1, wherein the PCIe device resources include at least one of memory space available in the PCIe storage device, and execution time for a processor in the PCIe storage device.

4. The method of claim 1, wherein the PCIe device resources are allocated based on availability of at least one PCIe port accessed by the hosts on the PCIe storage device.

5. The method of claim 1, wherein the allocation of PCIe device resources is based on at least one of a combination of physical functions and virtual functions provided by the PCIe storage device.

6. The method of claim 1, wherein the calculated QoS is calculated for a plurality of PCIe functions assigned equal weighting for execution and allocation of PCIe device resources.

7. The method of claim 1, wherein the calculated QoS is calculated for a plurality of PCIe functions assigned different weighting for execution and allocation of PCIe device resources.

8. The method of claim 1, wherein the allocation of PCIe device resources is based on respective weightings assigned to each one of a plurality of PCIe functions.

9. The method of claim 8,
wherein the respective weightings are assigned based on at least one of a user specific command, and a side band management protocol.

10. The method of claim 1, further comprising:
detecting a payload for at least one of the queued subset of commands; and
normalizing the payload in the PCIe storage device based on the PCIe device resources available in the PCIe storage device.

11. The method of claim 1, wherein the fixed QoS is defined as a ratio of total free resources available in the PCIe storage device for each PCIe function to a total payload from the PCIe function.

12. The method of claim 1,
wherein the PCIe storage device is a multi-port, multi-function storage device.

13. A method of executing in a Peripheral Component Interconnect Express (PCIe) storage device a first command received from a first host and a second command received from a second host, the method comprising:
receiving the first command associated with a first PCIe function in a first PCIe port of the PCIe storage device and receiving the second command associated with a second PCIe function in a second PCIe port of the PCIe storage device;
queuing the first and second commands in a first sequence according to a command arbitration policy established for the PCIe storage device;
defining a second sequence of execution for the first and second commands by applying a calculated Quality of Service (QoS) to the queued first and second commands;
allocating PCIe device resources based on payload information corresponding to the first and second commands;
determining an execution time for each one of the first and second commands;
pushing at least one of the first and second commands to a wait queue; and
calculating the calculated QoS for at least one of the first and second commands following the determination of the execution time.

14. The method of claim 13,
wherein the defining of the second sequence of execution for the first and second commands further comprises applying a weighting to each one of the first and second commands based respectively on the first PCIe function and the second PCIe function.

15. The method of claim 14, wherein the applied weightings include a first weighting applied to the first command, and a second weighting different from the first weighting applied to the second command.

16. A Peripheral Component Interconnect Express (PCIe) storage device that provides a fixed Quality of Service (QoS) to multiple hosts accessing the PCIe storage device, the PCIe storage device comprising:
PCIe ports configured to receive a plurality of commands from any one of the hosts;
PCIe function queues respectively associated with the PCIe ports;
a module that fetches a subset of the plurality of the commands from the PCIe function queues, queues the commands in a first sequence according to a command arbitration policy established for the PCIe storage device, and stores the queued commands in an internal memory of the PCIe storage device; and
a module that retrieves the queued commands from the internal memory as retrieved commands in a second sequence determined by applying a calculated QoS to at least one of the queued commands;
wherein the PCIe storage device is operated by determining an execution time for each one of the retrieved commands, pushing at least one of the retrieved commands to a wait queue, and calculating the calculated QoS for at least one command included in a combination of the queued commands and the at least one command pushed to the wait queue following the determination of the execution time.

17. The PCIe storage device of claim 16,
wherein the PCIe storage device is a NAND flash memory device.

18. The PCIe storage device of claim 16,
wherein the PCIe storage device executes a plurality of PCIe functions in response to the received commands, the PCIe functions including at least one of a physical function and a virtual function.

* * * * *